United States Patent
Win et al.

(10) Patent No.: US 6,804,312 B1
(45) Date of Patent: Oct. 12, 2004

(54) METHODS AND SYSTEMS FOR SPATIAL PROCESSING

(75) Inventors: Moe Z. Win, Highlands, NJ (US); Jack Harriman Winters, Middletown, NJ (US)

(73) Assignee: AT&T Corp., New York, NY (US)

( * ) Notice: Subject to any disclaimer, the term of this patent is extended or adjusted under 35 U.S.C. 154(b) by 746 days.

(21) Appl. No.: 09/722,897

(22) Filed: Nov. 27, 2000

Related U.S. Application Data (60) Provisional application No. 60/175,420, filed on Jan. 11, 2000.

(51) Int. Cl.$^7$ ................................................. H04B 7/10
(52) U.S. Cl. ........................................ 375/347; 455/135
(58) Field of Search .................................. 375/299, 347, 375/260, 267, 349; 455/133, 134, 135

(56) References Cited

U.S. PATENT DOCUMENTS

| | | | | |
|---|---|---|---|---|
| 5,819,168 A | * | 10/1998 | Golden et al. | 455/303 |
| 5,859,880 A | * | 1/1999 | Ljungberg et al. | 375/349 |
| 5,991,273 A | * | 11/1999 | Abu-Dayya | 370/252 |
| 6,317,466 B1 | * | 11/2001 | Foschini et al. | 375/267 |

* cited by examiner

*Primary Examiner*—Stephen Chin
*Assistant Examiner*—Kevin Kim (57) ABSTRACT

The present invention provides techniques to determine an antenna selection and associated weights for a transmission system having multiple antennas. A receiver first samples signals received on each antenna and the channel characteristics for each received signal is calculated. The signal-to-interference-plus-noise (SINR) ratio for various combinations of antennas is estimated using the channel characteristics and a subset of antennas and accompanying weights are determined that can provide an advantageous SINR.

2 Claims, 8 Drawing Sheets

METHODS AND SYSTEMS FOR SPATIAL PROCESSING

This application claims priority under 35 U.S.C.§ 119(e) of U.S. Provisional Patent Application No. 60/175,420, filed on Jan. 11, 2000, which is incorporated herein by reference.

BACKGROUND OF THE INVENTION

1. Field of Invention

This invention relates to methods and systems for spatial processing in wireless systems.

2. Description of Related Art

As wireless communication systems such as Enhanced Data Rates for Global Evolution (EDGE) are standardized, the importance of providing clear and cost-effective communication techniques increases. Various obstacles include mitigating the effects of noise, co-channel interference (CCI), which results from multiple communication channels using the same frequency spectrum, and Rayleigh fading and inter-symbol interference (ISI), which can result when transmitted signals travel along several paths to an intended receiver.

Currently, noise, Rayleigh fading, ISI and CCI can be mitigated by using some form of equalizer in concert with multiple antennas, each antenna having various electronic front-ends. Unfortunately, electronic front-ends can be expensive and require substantial power. Accordingly, new methods and systems that can accommodate large numbers of antennas without these problems are desirable.

SUMMARY OF THE INVENTION

Various techniques are provided for antenna selection and weight calculation for a transmission system having multiple antennas.

The present invention provides systems and methods for selecting a subset of antennas in a receiver having N antennas and L electronic front-ends. The receiver first samples the signals received on each of the N antennas and the channel characteristics for each received signal is calculated. The signal-to-interference-plus-noise (SINR) ratio for various combinations of antennas is estimated and a subset of up to L antennas is selected to provide an advantageous SINR.

The present invention also provides systems and methods for selecting a subset of antennas in a transmitter having N number of antennas and L weighting devices and electronic front-ends. A receiver first samples received signals for each of the N transmitter antennas and the channel characteristics for each received signal are calculated. The signal-to-interference-plus-noise (SINR) ratio for various combinations of antennas is estimated and a subset of up to L antennas are selected to provide an advantageous SINR. Each transmitted signal is also weighted to further provide an advantageous SINR at the receiver.

Other features and advantages of the present invention are described below and are apparent from the accompanying drawings and from the detailed description which follows.

BRIEF DESCRIPTION OF THE DRAWINGS

The invention is described in detail with regard to the following figures, wherein like numerals reference like elements, and wherein.

DETAILED DESCRIPTION OF PREFERRED EMBODIMENTS

Wireless receivers must often use multiple antennas to mitigate the effects of noise, Rayleigh fading, inter-symbol interference (ISI) and co-channel interference (CCI). Unfortunately, conventional receivers require expensive and power-consuming electronic circuitry for each antenna. In operation, the conventional receivers process the signals received by each antenna by mixing the signals to lower frequencies, then filtering, digitizing and advantageously combining the signals to extract information.

The present invention provides various techniques based on hybrid-selection/optimum combining (H-S/OC) to select a subset of available antennas that, when the signals from these antennas are advantageously combined, substantially optimizes a signal-to-interference-plus-noise ratio (SINR) without substantially affecting performance as compared to combining the signals from all available antennas. For receivers having large numbers of antennas, an H-S/OC approach can require only a small subset of the antennas with respective electronic circuitry to effectively receive and process radio signals.

While a similar antenna selection approach known as the hybrid-selection/maximum ratio combining (H-S/MRC) technique has been studied, the H-S/MRC technique is limited to optimizing a signal-to-noise ratio (SNR) of a received signal, as opposed to the SINR or signal-to-interference (S/I) ratio. Accordingly, for environments having an interference source, a system using an H-S/OC technique can better transmit information than systems limited to using H-S/MRC.

Figure 1:
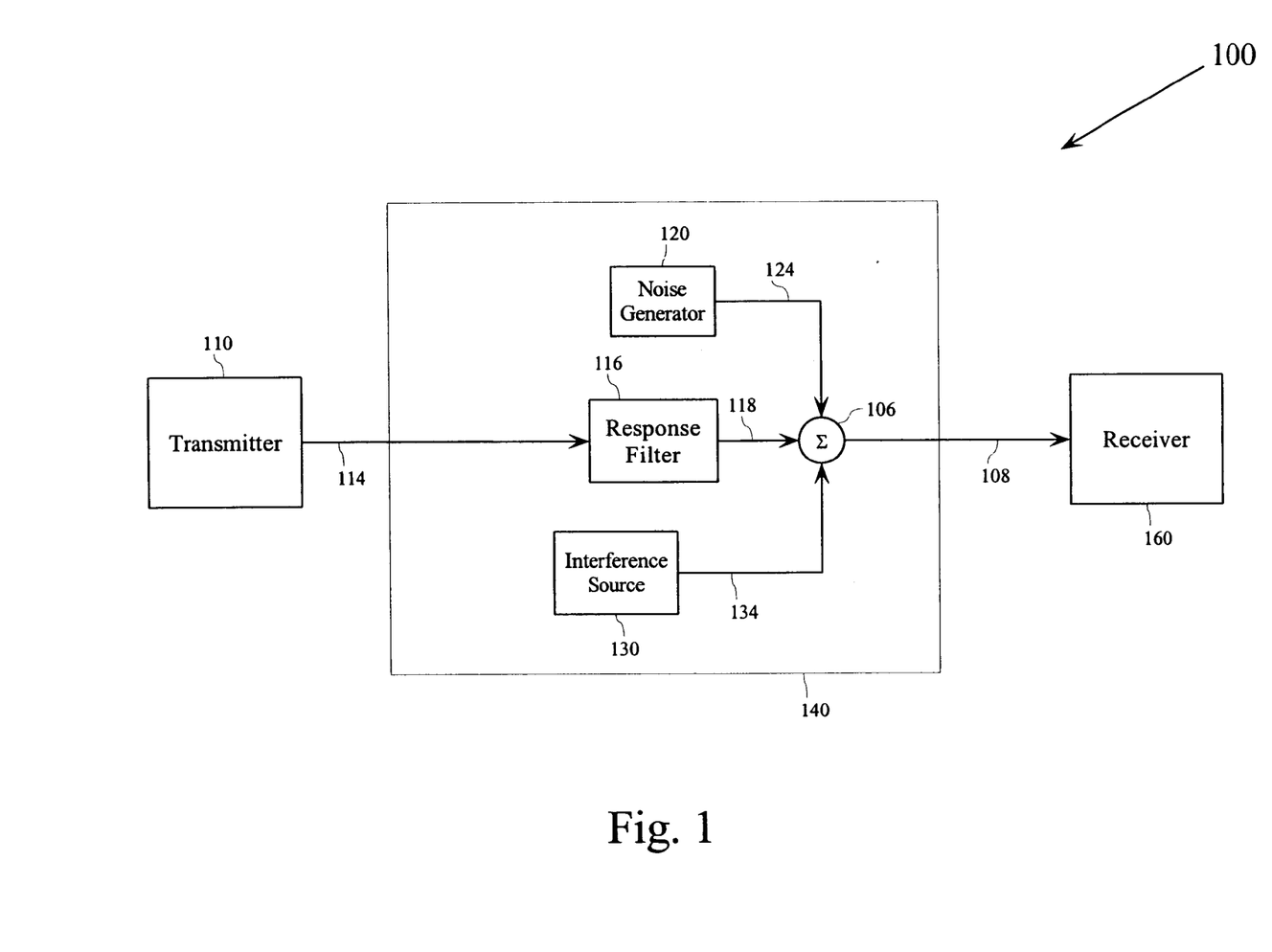
FIG. 1 is a block diagram of an exemplary communication system model.

FIG. 1 is block diagram of a model of an exemplary transmission system 100. The system 100 includes a transmitter 110, a transmission medium 140 and a receiver 160. In operation, the transmitter 110 can transmit a signal containing digital symbol information (i.e., the desired signal) to the transmission medium 140 via link 114 and the transmission medium 140 can provide filtered digital symbol information to the receiver 160 via link 108.

The transmitter 110 can be any one of a number of different sources, such as a wireless transmitter, a transmission system employing wires such as a twisted wire pair, a transmitter adapted for transmitting across a coaxial cable, an optical transmitter, a fiber optic transmitter, a sonic transmitter or any other known or later developed device suitable for transmitting digital symbol information.

The exemplary transmission medium 140 has a response filter 116, a co-channel interference source 130, a noise generator 120 and a summing junction 106. The response filter 116 can receive the digital symbol information from the transmitter 110 via the link 114 and can provide filtered digital symbol information to summing junction 106 via the link 118. As the desired signal is transmitted by the transmitter 110 and propagates through the transmission medium 140, the desired signal is distorted according to the characteristics of the transmission medium 140.

Concurrent with the desired signal, the noise generator 120 generates noise and the co-channel interference source 130 generates one or more second signals that are received by the summing junction 106 along with the desired signal. The summed signals are then received by the receiver 160 via link 108.

The response filter 116 can be any combination of filters that arise due to any natural or artificial characteristics of the transmission medium 140. The noise generator 120 can be any combination of sources capable of generating noise, including thermal average white Gaussian noise (AWGN), and the co-channel interference source 130 can be any number of systems or sources that can produce co-channel interference in the receiver 160. The summing junction 106 can be any device that can receive various signals, combine the signals, and provide the combined signals to the receiver 160.

The receiver 160 can be any one of a number of different receivers, such as a wireless receiver, a reception system employing wires such as a twisted wire pair, a receiver adapted to receive signals from a coaxial cable, an optical receiver, a fiber optic receiver, a sonic receiver or any other known or later developed device that can receive digital symbol information.

The exemplary links 114 and 108 are a combination of devices including one or more antennas and associated electronics that can pass digital symbol information from the transmitter 110 to the transmission medium 140 and from the transmission medium 140 to the receiver 160, respectively. However, links 114 and 108 can alternatively be any known or later developed combination of systems or devices that can receive/propagate signals containing digital symbol information from the transmitter 110 and provide the signal to the receiver 160 without departing from the spirit and scope of the present invention.

Figure 2:
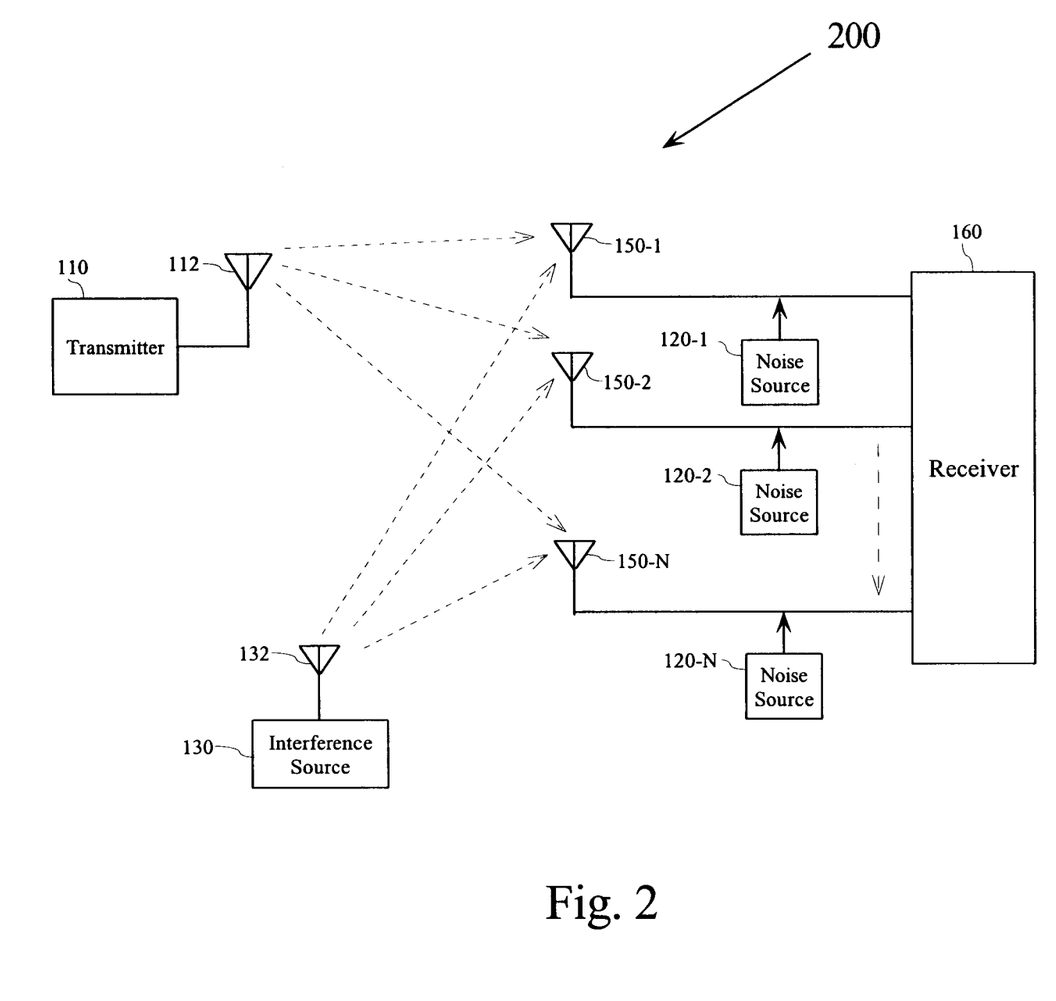
FIG. 2 is a block diagram of an exemplary communication system.

FIG. 2 is an exemplary block diagram of a wireless transmission system 200. The wireless transmission system 200 includes a transmitter 110 with a transmitter antenna 112, a receiver 160 with multiple receiver antennas 150-1, 150-2, . . . 150-N, a number of noise sources 120-1, 120-2, . . . 120-N coupled to each receiver antenna 150-1, 150-2, . . . 150-N, and a co-channel interference source 130 with a co-channel antenna 132.

As shown in FIG. 2, a signal containing digital symbol information, i.e., a desired signal, is transmitted from the transmitter 110 to the receiver 160 using antennas 112 and 150-1, 150-2, . . . 150-N, respectively. While the exemplary desired signal contains digital information, it should be appreciated that the desired signal can optionally contain digital, analog or a hybrid of digital and analog information without departing from the spirit and scope of the present invention. The desired signal can reach each of the various receiver antennas 150-1, 150-2, . . . 150-N through a variety of direct paths, or channels, and indirectly through a large variety of indirect paths (not shown) that can occur as a result of the radio signals interacting with various obstacles such as man-made and natural structures (not shown). As each of the receiver antennas 150-1, 150-2, . . . 150-N receives the desired signal, they also receive AWGN noise from their respective noise sources 120-1, 120-2, . . . 120-N and co-channel interference signals from the co-channel interference source 130.

Figure 3:
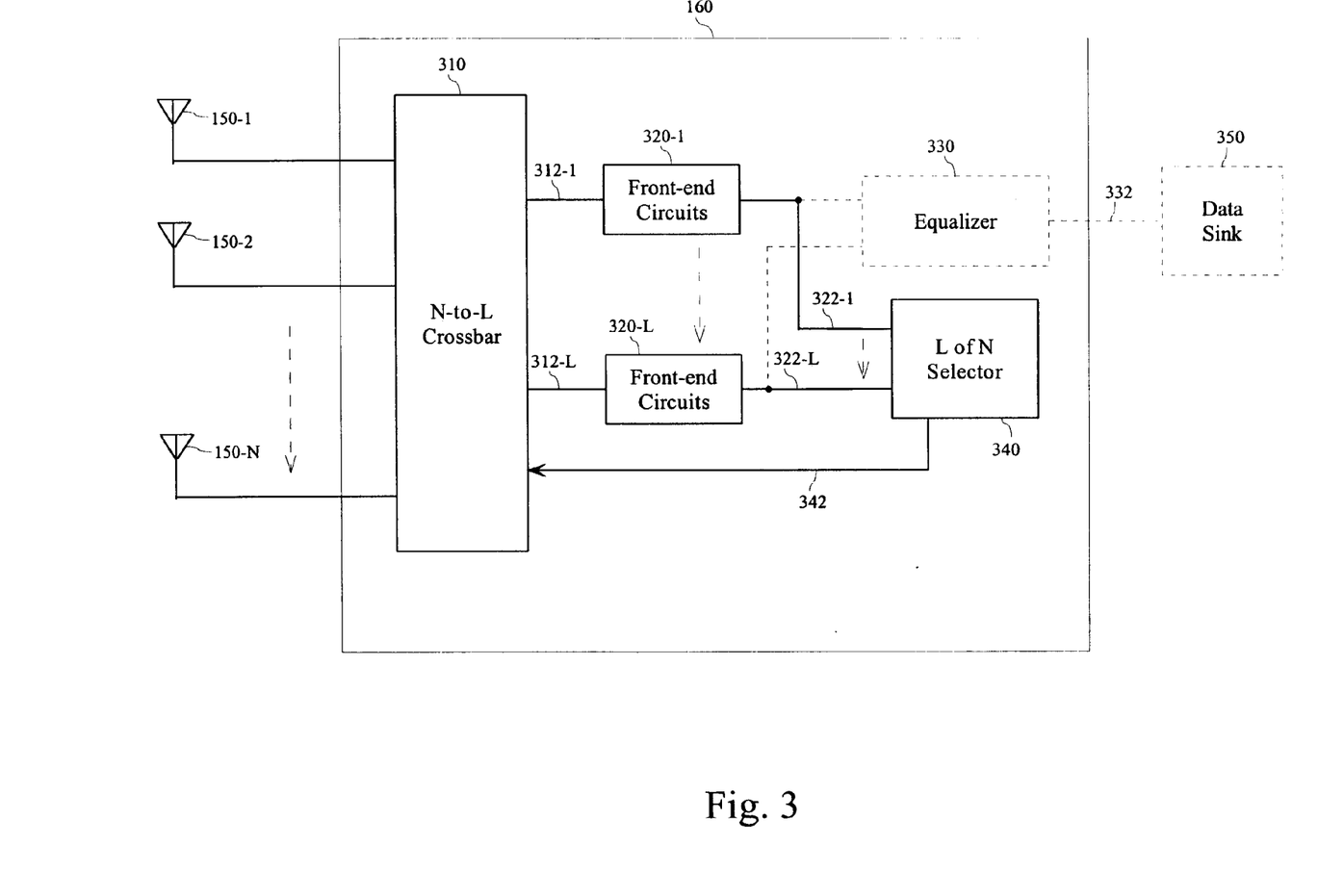
FIG. 3 is a block diagram of an exemplary receiver of FIG. 2 having multiple antennas.

FIG. 3 is a block diagram of the receiver 160 of FIG. 2. The receiver 160 includes the plurality of antennas 150-1, 150-2, . . . 150-N, an N-to-L crossbar 310, a number of front-end circuits 320-1, . . . 320-L, an equalizer 330 and an L of N selector 340. The equalizer 330 is further connected to a data sink 350 via link 332.

In operation, the receiver 160 receives signals having digital symbol information using the antennas 150-1, 150-2, . . . 150-N, which provide the received signals to the N-to-L crossbar 310. The N-to-L crossbar 310 then provides a subset of the received signals to the front-end circuits 320-1, . . . 320-L. The front-end circuits 320-1, . . . 320-L then condition the selected signals and provide the conditioned signals to the equalizer 330, which extracts symbols from the conditioned signals and passes the extracted symbols to the data sink 350.

The received signal may be an iso-synchronous burst such as a time division multiple access (TDMA) burst with an 8-PSK modulation, an asynchronous burst, a continuous signal, or any other known or later developed communication format. Furthermore, the received signal can be modulated according to a QPSK, FSK or any other known or later developed modulation scheme. For the discussion below, it is assumed that the received signal is an iso-synchronous TDMA burst. It is further assumed that each antenna 150-1, 150-2, . . . 150-N can receive multiple images of each received signal giving rise to Rayleigh fading and ISI, and that the received signals can be further corrupted with AWGN and CCI signals.

Each exemplary received signal can contain any number of payload symbols along with a number of training symbols and guard symbols. Payload symbols are symbols containing the data to be transmitted. Training symbols are predetermined symbols placed at known positions with the received signal that enable the equalizer 330 to better adapt its various systems to characterize the various individual channels and thus more accurately estimate the payload symbols. Guard symbols are symbols that pad either or both of the beginning and end of the burst and can be used for a variety of purposes, including providing buffering, timing and synchronization.

The antennas 150-1, 150-2, . . . 150-N can receive signals and provide the received signals to the N-to-L crossbar 310. The N-to-L crossbar 310 receives the radio signals provided by the antennas 150-1, 150-2, . . . 150-L and, upon direction from the L of N selector 340, provides a subset of the received radio signals to the front-end circuits 320-1, . . . 320-L via links 312-1, . . . 312-L, respectively.

While the exemplary receiver 160 receives symbol information using an array of antennas 150-1, 150-2, . . . 150-N, it should be appreciated that signals alternatively can be received using any known or later developed device or system that can provide symbol information to the N-to-L crossbar 310 and be processed by the front-end circuits 320-1, . . . 320-L and be further processed by the L of N selector 340. Such devices include electrical wires, optical links, a direct serial/parallel cable connection, a connection over a wide area network, a connection over an intranet or an extranet, a connection over the Internet, or a connection over any distributed processing network or system.

The exemplary N-to-L crossbar 310 contains a number of programmable high-frequency, low-impedance switches. However, the N-to-L crossbar 310 alternatively can contain any combination of hardware and software capable of receiving a number of signals from the plurality of antennas 150-1, 150-2, . . . 150-L and providing a subset of the received signals to one of the front-end circuits 320-1, . . . 320-L. In general, any known or later developed connection, computer program or structure usable to provide symbol information from the antennas 150-1, 150-2, . . . 150-L to the equalizer 330 and of the L of N selector 340 can be used.

The front-end circuits 320-1, . . . 320-L receive the selected signals, condition the signals and provide the conditioned signals to the equalizer 330 and the L of N selector 340 via links 322-1, . . . 322-L. The front-end circuits 320-1, . . . 320-L can provide a variety of conditioning operations as required by design. For example, each front-end circuit can contain frequency shifters such as heterodyne or super-heterodyne mixers that can convert radio-frequency signals to either baseband or intermediate frequency (IF) signals. The front-end circuits 320-1, 320-L can further contain electronics that demodulate signals, filter the signals, digitize the signals and then pass the digitized signals to both the equalizer 330 and the L of N selector 340. However, it should be appreciated that the front-end circuits 320-1, . . . 320-L can generate conditioned signals according to a wide variety of design criteria and can accordingly be any known or later developed device or system capable of receiving signals from the N-to-L crossbar 310 and providing conditioned signals to the equalizer 330 and the L of N selector 340.

The equalizer 330 receives conditioned signals via the links 322-1, . . . , 322-L, performs a spatial equalization technique on the conditioned signals, extracts a number of symbols and provides the extracted symbols to the data sink 350 via link 332. In various exemplary embodiments, the equalizer 330 uses a minimum mean-square error (MMSE) equalization technique to weight and combine the conditioned signals to minimize a mean-square error in the output signal. In other exemplary embodiments, the equalizer 330 weights and combines the conditioned signals to maximize the SINR in the output signal. However, it should be appreciated that the equalizer 330 can perform any spatial equalization technique or alternatively use a combination of known or later developed spatial and temporal equalization without departing from the spirit and scope of the present invention.

The data sink 350 receives detected symbols from the equalizer 330 via the link 332. In various exemplary embodiments, the data sink 350 can be any device capable of receiving data, such as an electronic circuit capable of transforming the data into an acoustic format or a computer with a storage system. However, it should be appreciated that the data sink 350 can be any combination of hardware and software capable of receiving, relaying, storing, sensing or perceiving data provided by the equalizer 330.

As discussed above, the L of N selector 340 also receives conditioned signals over links 322-1, . . . 322-L. As signals are received, the L of N selector 340 characterizes the performance of the individual channels and signals provided by each antenna 150-1, 1502, . . . 150-N. Based on the performance characteristics, the L of N selector 340 can then determine various combinations of antennas that can provide superior performance as compared to other combinations of antennas. Accordingly, the L of N selector 340 can select a particular combination and direct the N-to-L crossbar 310 to enable the selected antenna combination via link 342.

As the number of antennas 150-1, 150-2, . . . 150-N is greater than the number of front-end circuits 320-1, . . . 320-L, it should be appreciated that sampling different subsets of antenna must be done over different periods. For example, for a receiver having twelve antennas and four sets of front-end circuits, the L of N selector 340 can select four antennas at a time during three separate time periods, determine the characteristics of each received signal provided by each antenna, and select up to any four of the twelve antennas.

In various exemplary embodiments, the L of N selector 340 can use a signal-to-interference-plus-noise (SINR) criteria to select an antenna subset. For example, the L of N selector 340 can select a combination of antennas that, in combination, provides a superior SINR. Alternatively, the L of N selector 340 can simply choose a number of antennas that individually provide the best signal SINR ratios. In other exemplary embodiments, the L of N selector 340 can use a signal-to-interference (S/I) criteria to similarly select an antenna subset that provides a superior S/I. That is, the L of N selector 340 can select a combination of antennas that, in combination, provides a superior S/I or alternatively can select a number of antennas that individually provide the best signal S/I ratios. However, it should be appreciated that the L of N selector 340 can use other criteria to select antennas, such as signal-to-noise-ratio (SNR) criteria, signal strength, or any other known or later developed criteria that can be used to select combinations of antennas without departing from the spirit and scope of the present invention.

Figure 4:
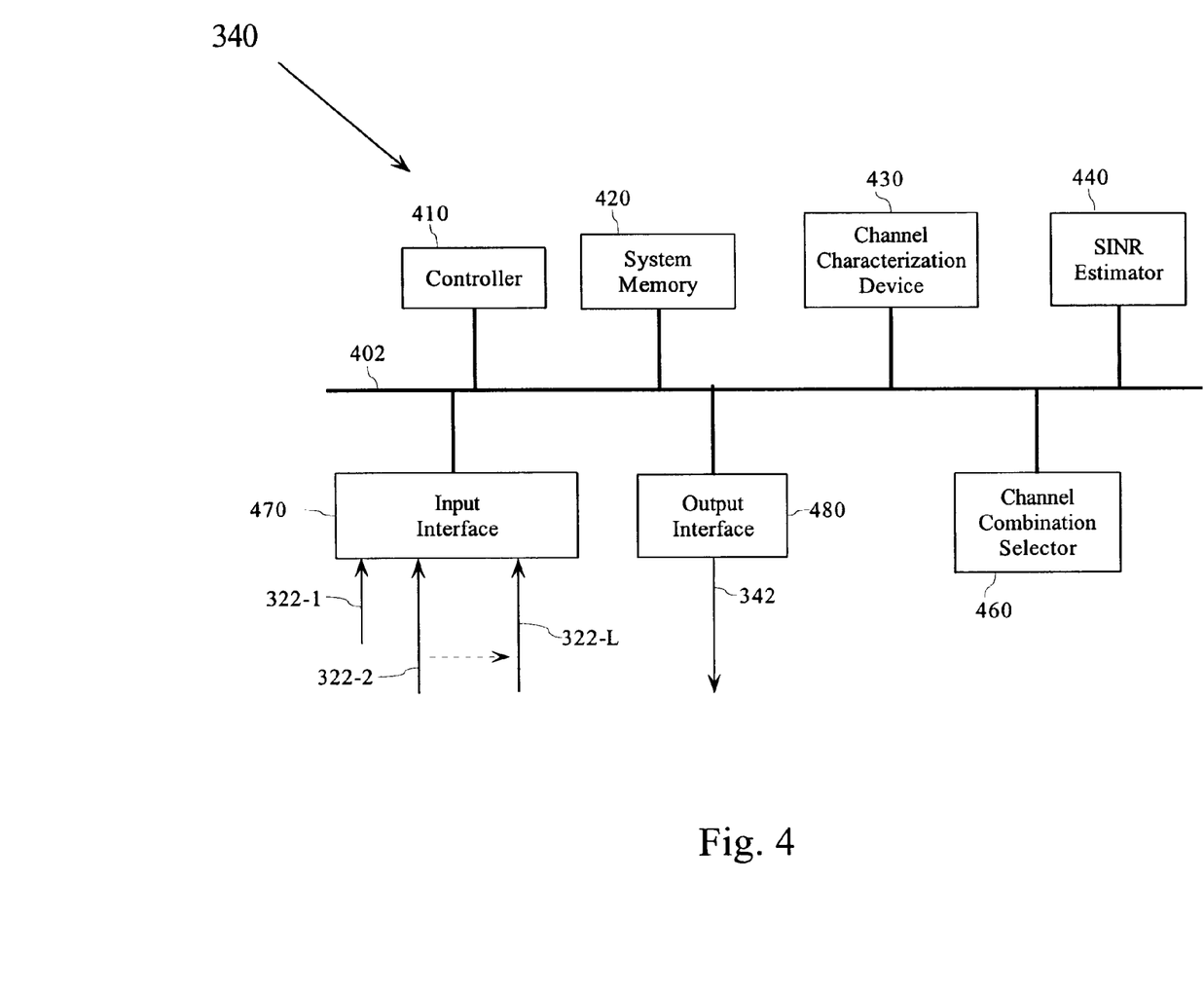
FIG. 4 is a block diagram of the exemplary selector of FIG. 3.

FIG. 4 shows a block diagram of an exemplary L of N selector 340 having a controller 410, a system memory 420, a channel characterization device 430, a signal-to-interference-plus-noise ratio (SINR) estimator 440, a channel combination selector 460, an input interface 470 and an output interface 480. The controller 410 interfaces with the other components 420–480 using control/data bus 402.

Under control of the controller 410, the input interface 470 can receive L number of signals provided by the different channels having digital symbol information via the links 322-1, . . . , 322-L. While the input device 470 can receive L number of signals at any time, the input device 470 can alternatively receive any number of signals by receiving L-channels of digital symbol information for a first time period, then receiving a different set of L-channels of digital symbol information during a second time period and repeating the process until a desired number of channels are sampled.

In various exemplary embodiments, the input interface 470 can receive digital symbol information from any device such as a wireless receiver, an analog to digital converter, disk drive, UART, LAN, WAN, parallel digital interface, serial digital interface, software interface or any combination of software and hardware in any form now known or later developed.

As the controller 410 imports the signals from the various channels, the controller 410 stores the signals in the system memory 420. After all available channels are sampled and stored, the controller 410 then copies each channel's signal from the system memory 410 to the channel characterization device 430.

The channel characterization device 430 receives the signals for each channel and analyzes the characteristics of each channel using training symbols embedded in the channels to produce a set of parameters for each channel. The channel characterization device 430 uses the embedded training symbols to determine the correlation of the received signal at each antenna with the desired signal to characterize the received signal channels and generates a cross-correlation matrix of the received signals to determine the received signal cross-correlation matrix that characterizes the desired signal and interference channels. However, it should be appreciated that any known or later developed technique that can characterize a received signal containing digital symbol information and produce a set of parameters that describe the characteristics of the channel can be used without departing from the spirit and scope of the present invention. After a number of channels have been characterized by the channel characterization device 430, the controller 410 transfers the characterization parameters of each channel to the estimator 440.

The estimator 440 receives the channel characterization parameters for the various channels and estimates the SINR at the equalizer 330 output for any subset of the received channels. The exemplary estimator 440 uses a Weiner-Hoff technique to generate weights from which the SINR is estimated. However, it should be appreciated that the estimator 440 can alternatively estimate the MMSE of the output signal when the spatial equalizer 330 uses weights generated according to the MMSE criteria, or the equalizer 330 can use any other known or later developed spatial or temporal/spatial equalization technique without departing from the spirit and scope of the present invention.

In various exemplary embodiments, the estimator 440 estimates the SINR for each subset of the available channels. For example, for a receiver with twelve antennas and four sets of front-end electronics, the exemplary estimator 440 estimates the SINR for all possible combinations of the twelve channels four at a time. However, it should be appreciated that the estimator 440 can estimate the SINR for other channel combinations. That is, for a receiver having L available channels, the estimator 440 can determine the SINR for any number of channels less than L including the SINR for individual channels. Upon deriving the SINR estimates for each of the combinations of channels of digital symbol information, the controller 410 will transfer the SINR estimates to the channel combination selector 460.

The channel combination selector 460 receives the SINR estimates and selects a channel combination likely to provide a high SINR as compared to the other combinations of channels. While the channel combination selector 460 selects channel combinations based on SINR, as discussed above, it should be appreciated that the channel combination selector 460 can alternatively select channels based on other criteria, such as signal-to-noise ratio, signal-to-interference ratios, signal strength and the like.

In various other embodiments, the channel combination selector 460 selects subsets of reduced-numbered channels. That is, for a receiver having L number of frontend electronics, the channel combination selector 460 can select a subset of channels less than L. For example, for the above-described receiver having twelve antennas and four sets of front-end electronics, the estimator 440 can provide SINR estimates for combinations of three antennas at a time and the channel combination selector 460 can select any three channels that can be fed to an equalizer. This provides an advantage in that an antenna selector can provide a number of signals to an equalizer while using the one or more unused channels, or roaming channels, to cyclically sample the remaining antennas. As channel characteristics for each channel may change over time, this approach can provide periodic updates. Accordingly, the estimator 440 and the channel combination selector 460 can constantly reevaluate the most advantageous combinations of antennas and provide the equalizer with periodic updates of these advantageous combinations without interrupting service.

In still other exemplary embodiments, the L of N selector 340 can select an initial set of channels and maintain this set until prompted by an external signal, such as an indication of an excessive error rate or a periodic timer. Upon receiving such a signal, the L of N selector 340 can re-sample each available channel and again provide the most advantageous combination of channels to an equalizer.

After the combination selector 460 selects an advantageous combination of channels, the controller 410 can provide the selected combination to an external device such as an N-to-L crossbar using the output interface 480 and output link 342. The output interface can export the channel combination decisions in any digital form or any information form that can represent channel combinations. Like the input interface 470, the output interface 480 should not be construed to refer exclusively to hardware, but can be any known or later developed combination of hardware and software capable of communicating or storing data.

Figure 5:
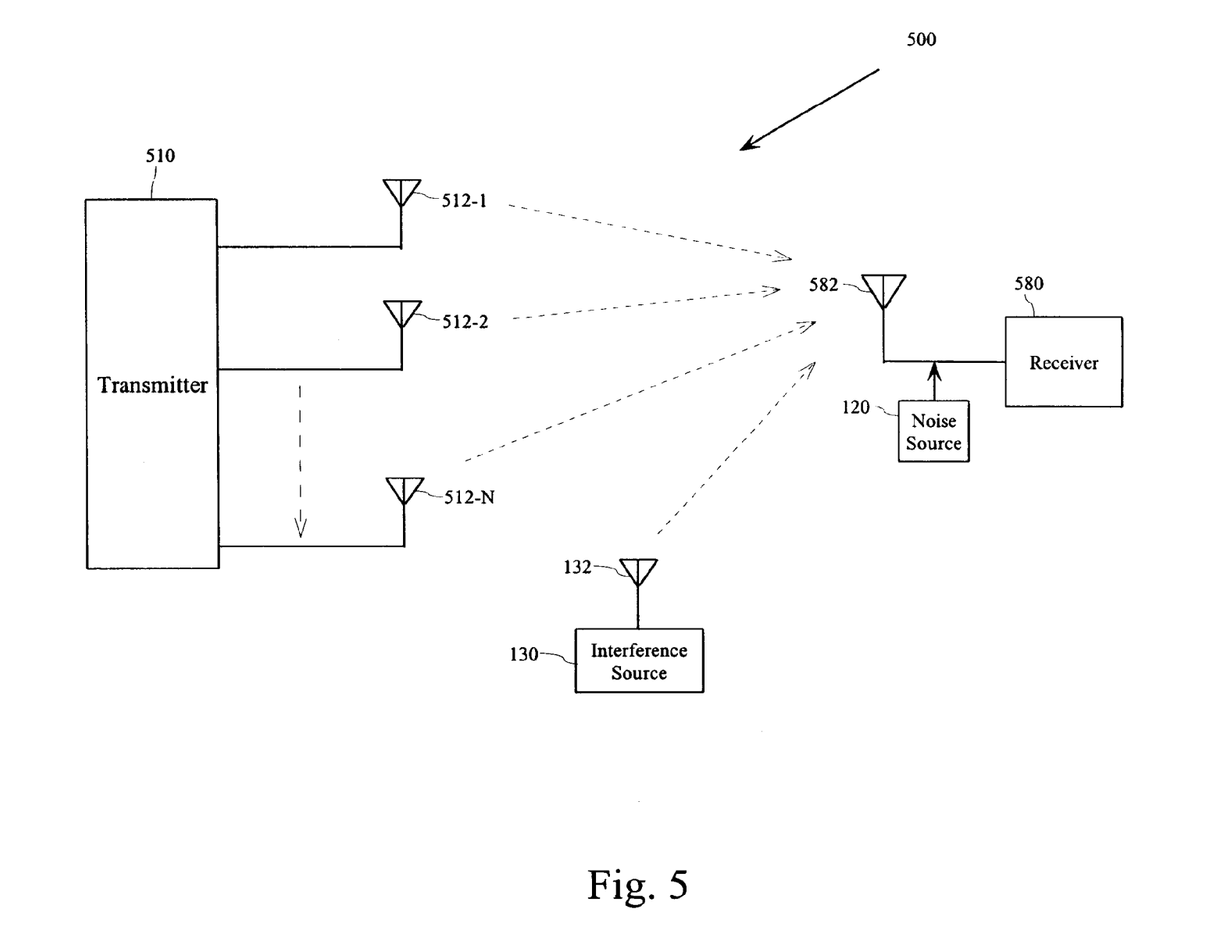
FIG. 5 is a second exemplary communication system.

FIG. 5 illustrates an alternative exemplary communication system 500. The communication system 500 includes a transmitter 510 with multiple transmitting antennas 512-1, 512-2 . . . 512-N and a receiver 580 with a receiver antenna 582, a noise source 120 and a co-channel interference source 130 with an interference antenna 132.

In operation, signals containing digital symbol information, i.e., desired signals, are transmitted from the transmitter 510 from each of the transmitter antennas 512-1, 512-2, . . . 512-N to the receiver 580 via the receiver antenna 582. As with the transmission system 200 of FIG. 2, each transmitted signal from each antenna can propagate to the receiver antenna 582 both directly and indirectly through a large variety of indirect paths. Also, as with the transmission system 200 of FIG. 2, the receiver 580 receives noise from the noise source 120 and signals from the co-channel interference source 130 with the desired signals.

As each of the desired signals are transmitted from each transmitter antenna 512-1, 512-2, . . . 512-N, the receiver 580 receives the various desired signals along with noise and co-channel interference. Accordingly, the receiver 580 can determine the channel characteristics for each antenna and provide feedback to the transmitter 510 via a feedback path (not shown) such that the transmitter 510 can select a subset of its antennas 512-1, 512-2 . . . 512-N and subsequently transmit using the subset of selected antennas. Furthermore, the transmitter 510 can weight each desired signal from the selected subset of antennas by manipulating the amplitude and phase of each desired signal such that the combined weighted signals as received by the receiver has an improved SINR as compared to signals transmitted by other combinations of antennas or differently weighted signals transmitted by a particular subset of antennas.

Figure 6:
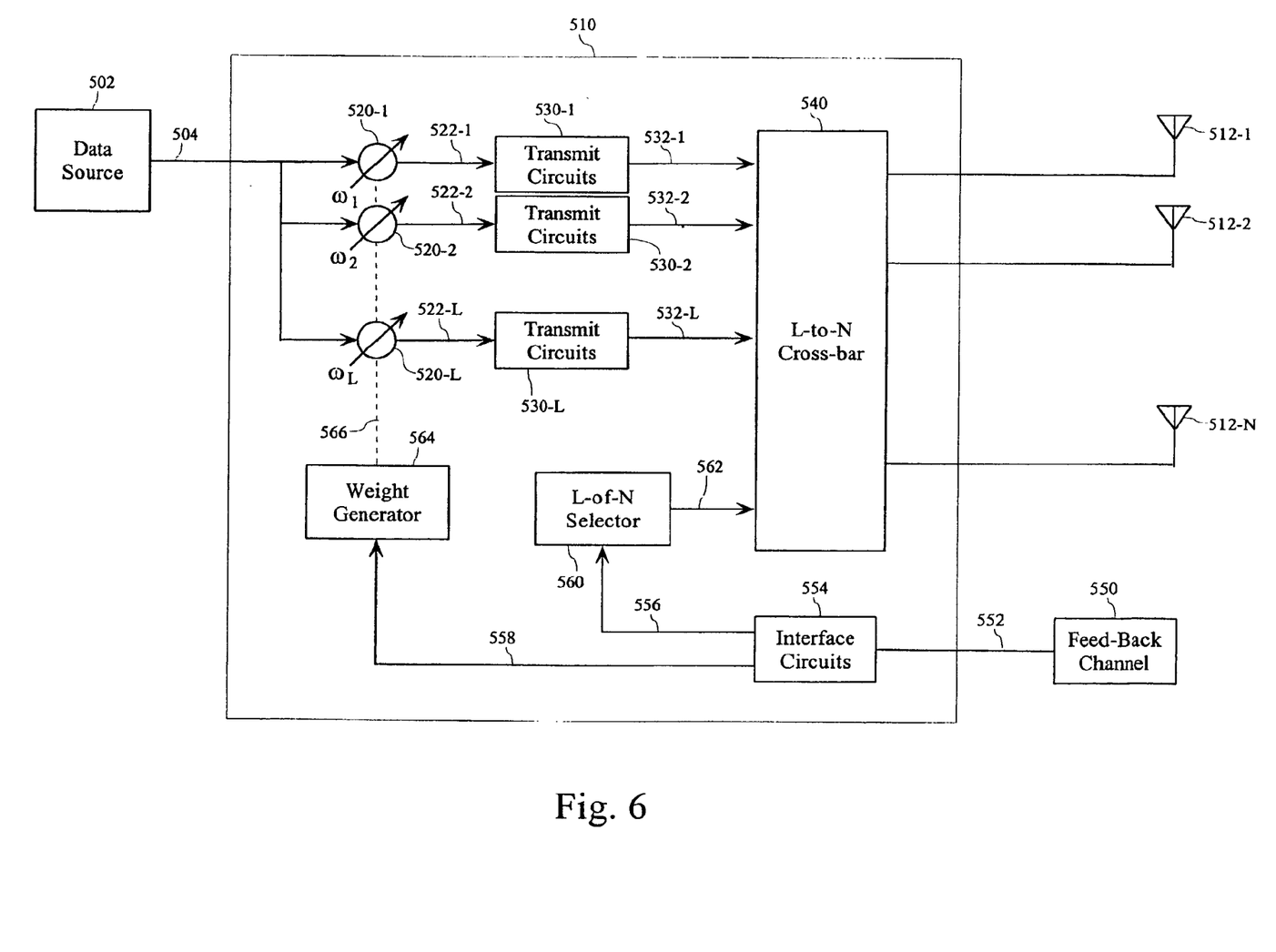
FIG. 6 is a block diagram of the exemplary transmitter of FIG. 5 having multiple antennas.

FIG. 6 is a block diagram of the transmitter 510 of FIG. 5. The transmitter 510 includes a number of weighting modules 520-1, 520-2, . . . 520-L, a number of transmit circuits 530-1, 530-2, . . . 530-N, an L-to-N cross-bar 540, a number of antennas 512-1, 512-2 . . . 512-N, a weight generator 564, an L-of-N selector 560 and interface circuits 554. The weighting modules 520-1, 520-2, . . . 520-L are further connected to a data source 502 via link 504 and the interface circuits 554 are connected to a feed-back channel 550 via link 552.

In operation, the transmitter 510 first enters into a training phase, where various subsets of the transmission antennas 512-1, 512-2 . . . 512-N are selected to provide signal samples that can be used to characterize channel combinations or individual channels. After the channels are characterized, the weighting modules 520-1, 520-2, . . . 520-N are adjusted to an advantageous amplitude and phase and a subset of the available transmission antennas 512-1, 512-2 . . . 512-N are selected to substantially optimize the SINR of the combined transmitted signals at a receiver.

During training, the data source 502 provides the weighting modules 520-1, 520-2, . . . 520-N with signals having digital symbol information using link 504. In various exemplary embodiments, the signals are iso-synchronous bursts, such as a TDMA burst with an 8-PSK modulation that contain a number of symbols including payload symbols, training symbols and guard symbols. However, the signals can alternatively be asynchronous bursts, continuous signals or signals using any other known or later developed format. Furthermore, the signal alternatively can be modulated according to any known or later developed format such as QPSK, FSK and the like.

As the weighting modules 520-1, 520-2 . . . 520-L receive the signals from the data source 502, each module manipulates the amplitude and the relative phase of the received signal and provides a plurality of weighted signals to the transmission circuits 530-1, 530-2 . . . 530-L using links 522-1, 522-2 . . . 522-L. Each of the weighting modules 520-1, 520-2, . . . 520-L manipulates the amplitude and relative phase of the received signal according to instructions from the weight generator 564. In various exemplary embodiments, the weighting modules 520-1, 520-2, . . . 520-L contain a combination of analog and/or digital circuits such as a digital signal processor or an application specific integrated circuit (ASIC) suitable to manipulate the amplitude and phase of a modulated signal. However, it should be appreciated that the weighting modules 520-1, 520-2 . . . 520-L can contain any combination of analog and digital circuitry that can manipulate the amplitude and phase of a modulated signal without departing from the spirit and scope of the present invention.

The transmit circuits 530-1, 530-2, . . . 530-L receive the weighted signals via links 522-1, 522-2, . . . 522-L, condition the weighted signals and provide the conditioned signals to the L-to-N cross-bar 540 via links 532-1, 532-2, . . . 532-L. The exemplary transmit circuits 530-1, 530-2, . . . 530-L typically contain a combination of circuits accommodating various wireless transmission functions, including filters, power amplifiers and other various circuitry required by a particular design.

The L-to-N cross-bar 540 receives the conditioned signals via links 532-1, 532-2, . . . 532-L and feeds each of the conditioned signals to one of the plurality of antennas 512-1, 512-2, . . . 512-N according to instructions from the L-of-N selector 560. In various exemplary embodiments, the L-to-N cross-bar 540 contains a number of programmable high-frequency, low-impedance switches. However, the L-to-N crossbar 540 alternatively can contain any combination of hardware and software capable of receiving a number of conditioned signals and providing each conditioned signal to one of the plurality of antennas 512-1, 512-2, . . . or 512-N.

As discussed above, the weighting modules 520-1, 520-2, . . . 520-L and L-to-N cross-bar 540 can be programmed during a training phase. During training, the transmitter 510 can send individual signal bursts from each antenna, one antenna at a time. A receiver (not shown) can receive each signal burst and calculate the channel characteristics between each transmitter antenna and the receiver. After any number of channel characteristics are determined, the receiver can determine a combination of antennas, including a single antenna, that can provide advantageous communication.

In various exemplary embodiments, the receiver can relay information relating to an antenna combination to the transmitter 510 using the fee-back channel 550. The exemplary feed-back channel 550 includes a separate antenna and electronics capable of receiving information from the receiver. However, the feed-back channel 550 can alternatively use one or more of the transmit antennas 512-1, 512-2, . . . 512-N in combination with receiver circuitry or any other now known or later developed technique that can transfer channel information from a receiver to the transmitter 510.

The interface circuits 554 receive the channel characteristics for the various transmission channels and forward the channel characteristics to the weight generator 564 and the L-of-N selector 560 via links 558 and 556, respectively.

The L-of-N selector 560 and the weight generator 564 can receive the channel characteristic information and work together to select an advantageous combination of antennas and weight the transmitted signals such that the combined signals received by a receiver can have advantageous properties, such as a superior SINR, as compared to other possible combinations of antennas and/or differently weighted signals. While the exemplary L-of-N selector 560 and weight generator 564 select antennas and manipulate weights according to a scheme to optimize SINR, other optimization techniques directed to signal-to-noise ratios, signal-to-interference ratios, signal strength or any other known or later developed optimization technique that can provide advantageous communication channels can alternatively be used without departing from the spirit and scope of the present invention.

As with the transmission system of FIG. 2, the exemplary L-of-N selector 560 and weight generator 564 select antennas and generate weights based on a Weiner-Hoff technique. However, it should be appreciated that any technique or approach that can select a subset of available antennas and/or manipulate weights of one or more signals can alternatively be used without departing from the spirit and scope of the present invention.

Figure 7:
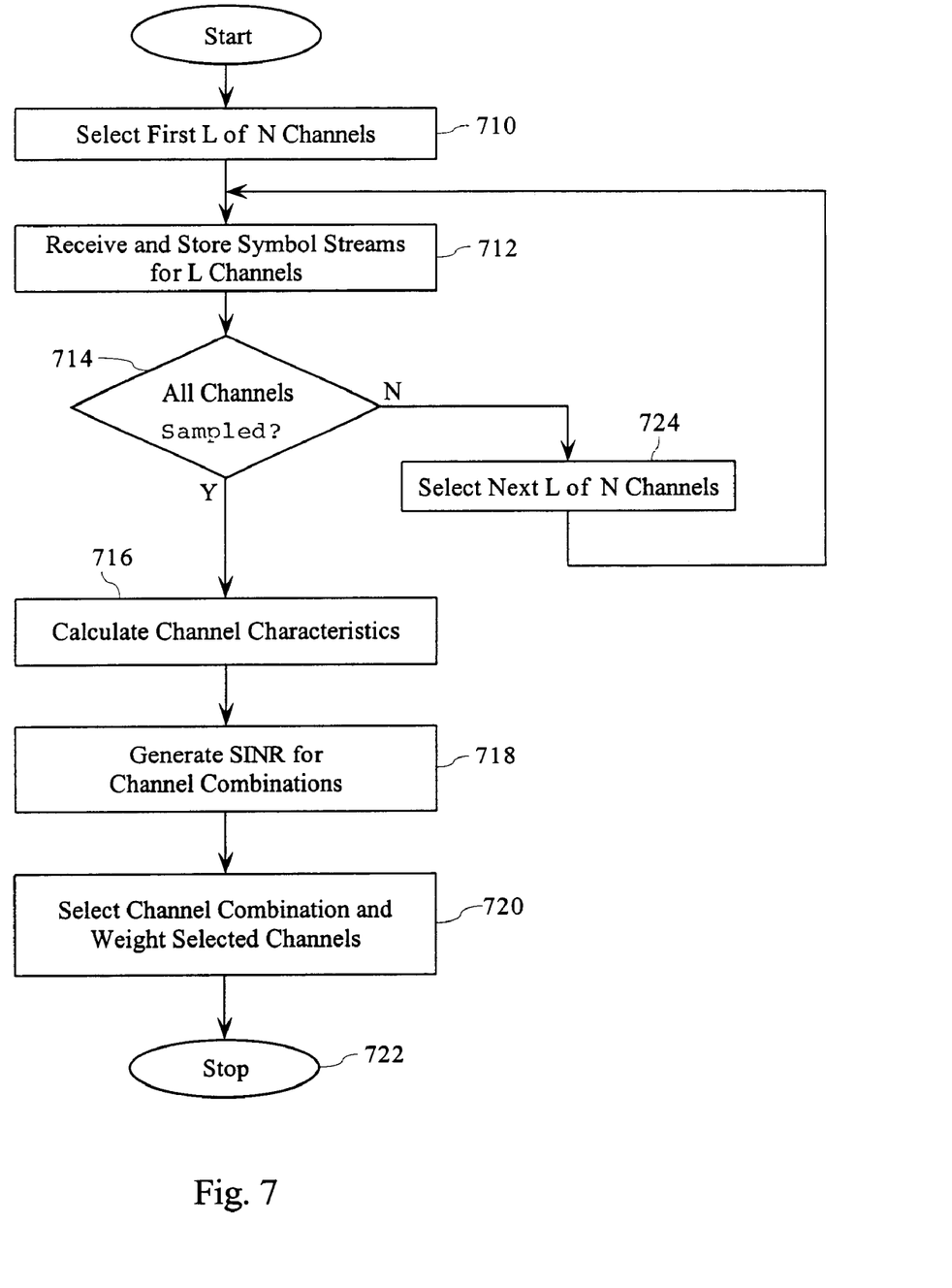
FIG. 7 is a flowchart outlining an exemplary method for communicating.

FIG. 7 is a flowchart outlining an exemplary operation for selecting a subset of available antennas in a communication system. The process starts in step 710, where a communication system having N antennas, or channels, selects a first L subset of the N channels. As discussed above, in various exemplary embodiments of the communication system, the plurality of antennas/channels can be an attribute of either a receiver or transmitter. Control continues to step 712.

In step 712, a stream of symbols is received and stored for each of the L channels. Next, in step 714, a determination is made whether all the available channels have been sampled. If all the available channels have been sampled, the process continues to step 716; otherwise, the process jumps to step 724.

In step 716 because all available channels have been sampled, the channel characteristics for each individual channel are calculated. The process continues to step 718.

In contrast, in step 724, because all available channels have not been sampled, a next L subset of the N channels is selected and the process jumps back to step 712 where a symbol stream is received and stored for each of the next L channels.

In step 718, the SINRs for various channel combinations are estimated. While the exemplary technique estimates the SINR for subsets of L channels one at a time, the SINR can be estimated for any number of channels less than L as may be found advantageous or otherwise required by design. Furthermore, as discussed above, while the exemplary process uses a Weiner-Hoff technique to estimate weights and determine the SINR from the estimated weights, any other known or later developed technique that can estimate SINR can be alternatively used as a design choice. The process continues to step 720.

In step 720, a subset of channels is selected and various weights associated with each selected channel are assigned. While the exemplary operation selects a subset of channels that provides the best SINR of all possible subsets, it should be appreciated that any subset of channels that provides an advantageous SINR can alternatively be selected.

Furthermore, if the diversity of antennas/channels is located in a receiver, the various weights may be used by the equalization function of the receiver. However, if the channel diversity is an attribute of a transmitter, it should be appreciated that the receiver should provide the transmitter with channel characteristic information and/or alternatively provide the desired channel combination and weights. After the channel and weights are selected, the process continues to step 722 where the process ends.

Figure 8:
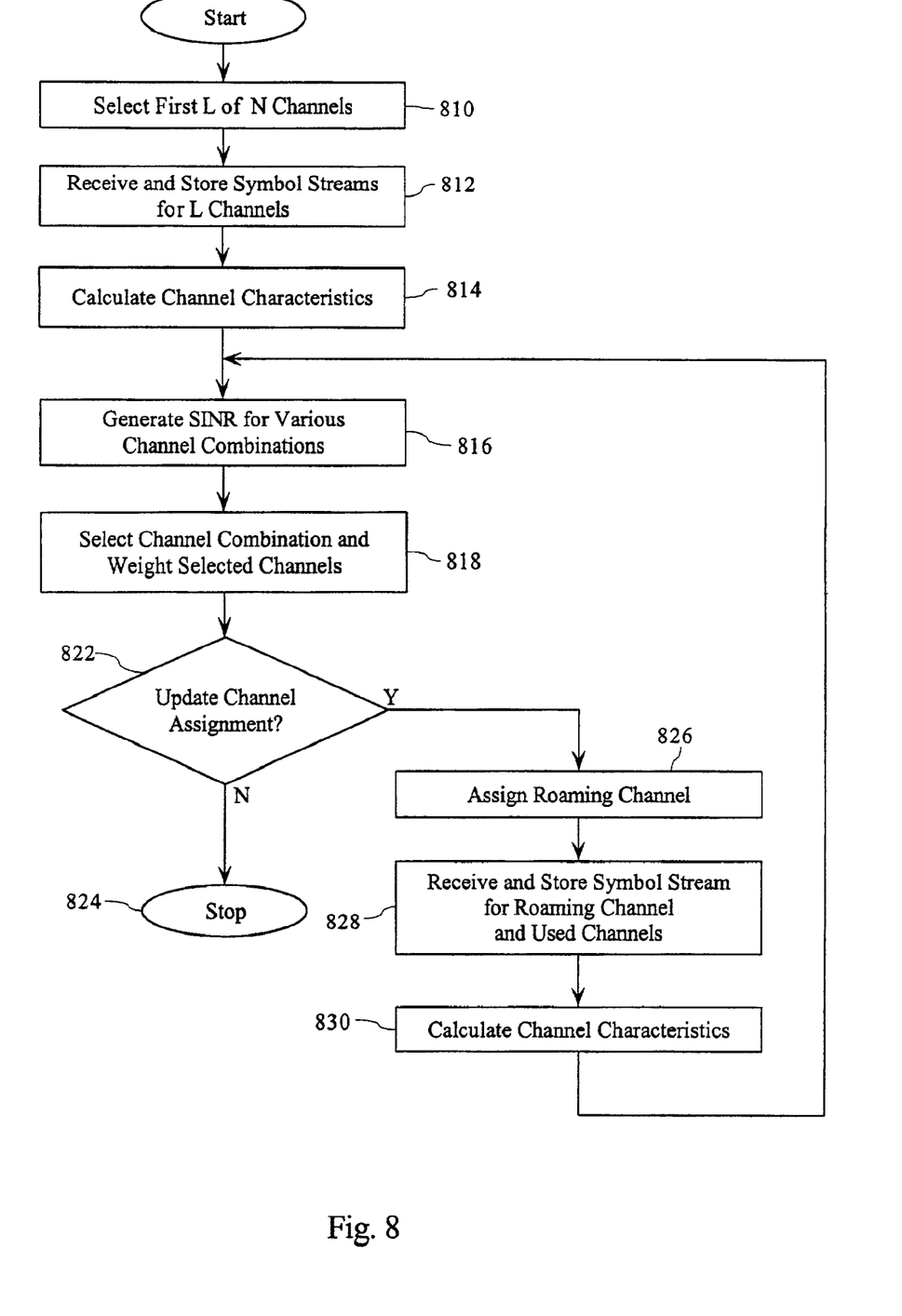
FIG. 8 is a flowchart outlining an alternative exemplary method for communicating.

FIG. 8 is a flowchart of an alternative exemplary process to select a subset of one or more channels from N available channels in a communication system. The process starts in step 810 where the first L subset of N available channels is selected. Next, in step 812, symbol streams for each of the L channels are received and stored. Then, in step 814 the channel characteristics for each of the L sampled channels are calculated. The process continues to step 816.

In step 816, the SINR for various channel combinations is estimated. Next, in step 818, a combination of channels and weights are selected for each channel. In step 822, a determination is made as to whether the combination of selected channels is to be updated. If the selected channel assignment is to be updated, the process continues to step 826; otherwise, the process jumps to step 824 where the process ends.

In step 826, a roaming channel is assigned to one of the unused channels. Next, in step 828 a symbol stream for the roaming channel as well as for any channels currently used are received and stored. Next, in step 830, the channel characteristics for the roaming and currently used channels are calculated and the process jumps back to step 816 where the SINR for various channel combinations are again estimated taking into account the new channel information provided by steps 826–830.

As shown in FIGS. 3, 4 and 6, the systems and methods of this invention are preferably implemented on a digital signal processor (DSP) or other integrated circuits. However, the systems and methods can also be implemented using any combination of one or more general purpose computers, special purpose computers, programmed microprocessors or microcontrollers and peripheral integrated circuit elements, hardware electronic or logic circuits such as Application Specific Integrated Circuits (ASIC), discrete element circuits, programmable logic devices such as a PLD, PLA, FPGA, or PAL, or the like. In general, any device on which exists a finite state machine capable of implementing the various elements of FIGS. 3, 4 and 6 and the flowcharts of FIGS. 7 and 8 can be used to implement the channel selection functions.

It should also be understood that each of the circuits shown in FIGS. 3, 4 and 6 can be implemented as portions of a suitably programmed digital signal processor. Alternatively, each of the circuits shown in FIG. 4 can be implemented as physically distinct hardware circuits within a micro-controller or microcomputer, or using an ASIC, a FPGA, a PDL, a PLA, or a PAL, or discrete logic elements or discrete circuit elements. The particular form that each circuit shown in FIGS. 3, 4 and 6 will take is a design choice and will be obvious and predictable to those skilled in the art.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A method for spatial processing in a communication system, comprising:
   receiving one or more signals using a plurality of available channels of a first communication device;
   selecting one or more of the plurality of available channels based on at least one or more interference parameters of the received signals, the one or more selected channels being a subset of the available channels, wherein the step of selecting includes:
   calculating channel characteristics for one or more of the available channels using one or more of the received signals;
   estimating one or more SINRs (signal-to-interference-plus-noise)ratio) for a plurality of subsets of the available channels based on the calculated channel characteristics; and
   selecting the one or more selected channels based on at least the one or more estimated SINRs; and
   communicating between the first communication device and a second communication device using the selected channels.

2. A communication apparatus, comprising:
   a plurality of channels; and
   a selection device that selects a subset of the plurality of channels to communicate information, wherein the selection device selects the subset of the plurality of channels based on at least one or more interference parameters of received signals, wherein the selection device includes:
   a channel characterization device that characterizes at least one channel corresponding to at least one of the plurality of channels;
   a signal-to-interference-plus-noise ratio estimator that estimates the signal-to-interference-plus-noise of at least one subset of the plurality of channels; and
   channel selector that selects a selected subset of the plurality of channels.

* * * * *